US005733082A

United States Patent [19]
Schrader

[11] Patent Number: 5,733,082
[45] Date of Patent: Mar. 31, 1998

[54] SECUREMENT SYSTEM

[76] Inventor: Darren Schrader, 2209 NE. Clackamas St., Portland, Oreg. 97232

[21] Appl. No.: 873,848
[22] Filed: Jun. 12, 1997

Related U.S. Application Data

[63] Continuation of Ser. No. 532,173, Sep. 22, 1995, abandoned.
[51] Int. Cl.[6] .................................................. B65D 61/00
[52] U.S. Cl. ........................... 410/115; 410/101; 410/105
[58] Field of Search .................................. 296/181, 183, 296/24.1; 410/96, 101, 102, 104, 105, 112, 113, 114, 115, 116

[56] References Cited

U.S. PATENT DOCUMENTS

| | | | |
|---|---|---|---|
| 2,319,471 | 5/1943 | Nystrom | 410/102 |
| 2,556,302 | 6/1951 | Stough et al. | 410/144 |
| 2,786,428 | 3/1957 | Arnold | 410/102 |
| 2,856,866 | 10/1958 | Holl | 410/115 |
| 3,106,377 | 10/1963 | Cotton | 410/116 |
| 3,351,356 | 11/1967 | Clark et al. | 410/116 |
| 3,381,925 | 5/1968 | Higuchi | 410/116 |
| 4,297,963 | 11/1981 | Beacom | 410/116 |
| 4,850,770 | 7/1989 | Millar, Jr. | 410/116 |
| 5,020,948 | 6/1991 | Ihara | 410/105 |
| 5,516,245 | 5/1996 | Cassidy | 410/102 |

OTHER PUBLICATIONS

Flyer: Cargotrol 56–250–03 Flush Floor Tie Down, 2 pages, Nov. 1995.
Catalog A94: Cargotrol Advanced Cargo Control Systems, 24 pages, Dec. 1994.

Primary Examiner—Karen B. Merritt
Assistant Examiner—Gregory A. Morse
Attorney, Agent, or Firm—Robert L. Harrington

[57] ABSTRACT

A tie down system for a cargo area of a carrier arranged to secure cargo in position. Multiple formed slots are formed in the side and end walls of the cargo area of the carrier. The slots are arranged to receive tie down devices to which securing devices utilized to hold the cargo in place may be secured. The slots are provided at intervals along the length and the height of the end and side walls to enable positioning a tie down device strategic to the cargo to be secured.

26 Claims, 3 Drawing Sheets

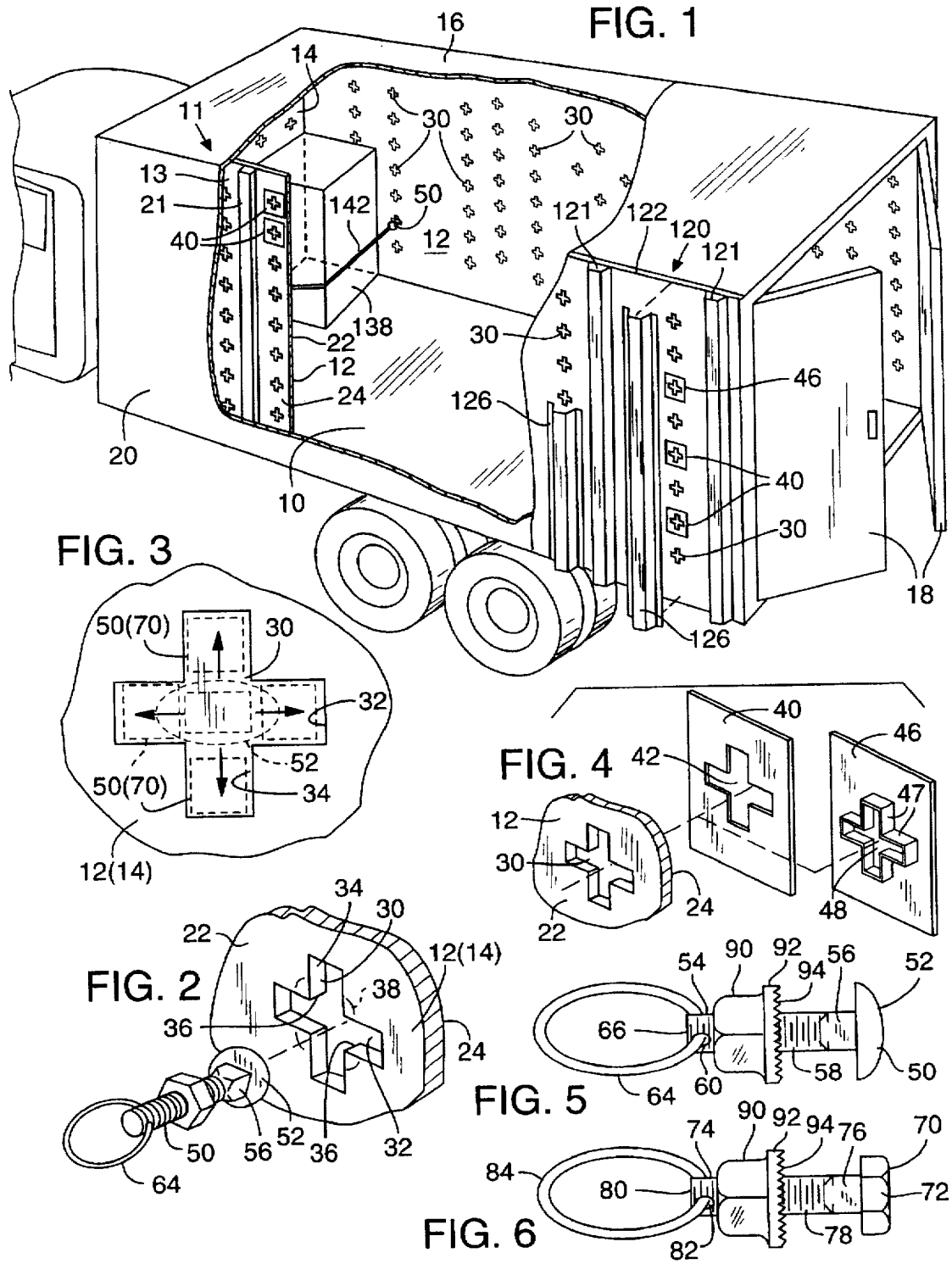

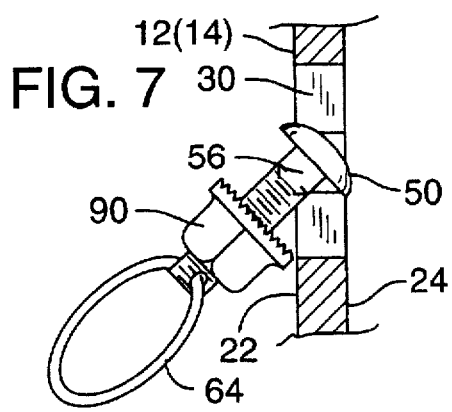
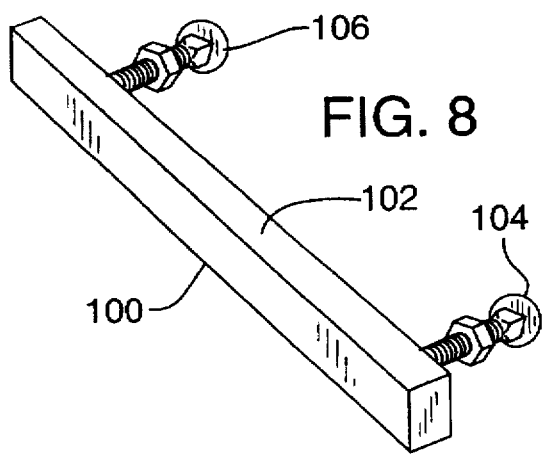
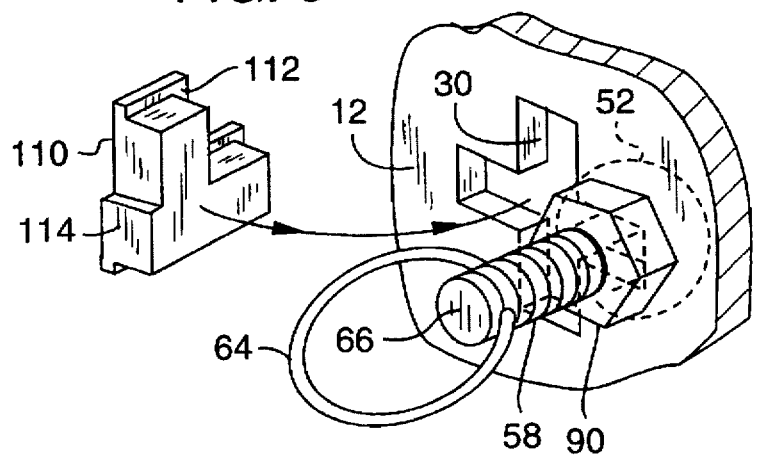
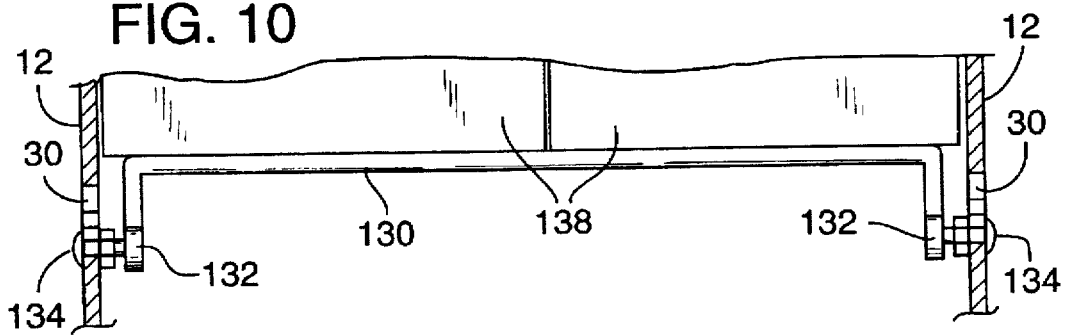

SECUREMENT SYSTEM

This application is a continuation of application Ser. No. 08/532,173 filed on Sep. 22, 1995 now abandoned.

FIELD OF THE INVENTION

This invention relates to a securement system sometimes hereafter referred to as a tie down system such as used for removably securing cargo and accessories to truck beds.

BACKGROUND INFORMATION

Cargo is shipped or conveyed by a variety of carriers over land, over water and through the air. Cargo is shipped over land by trucks, trains, vans, small pick-ups and is shipped over water by barges, ships and boats and through the air by airplanes and/or helicopters. Essentially each mode of transportation, with a few exceptions, has an enclosed or semi-enclosed cargo area in which the cargo is to be placed. To avoid damage to the cargo and/or the carrier during transit, that is, while the carrier is in motion, the cargo most often is secured within the cargo area in which it is shipped. A semi-trailer, for example, will have devices mounted on the wall of the cargo area for securing the cargo in place by hold down straps, chains, cables or ropes. The cargo is secured within the cargo area to prevent damage to the cargo and/or the carrier and to prevent shifting of the cargo within the cargo area.

Typically multiple tie down brackets are mounted to the vertical walls of the cargo area of the carrier. Often, the tie down devices are shaped plates that protrude from the wall and have a recess within which a ring or triangular shaped member is pivotally mounted. The protruding tie down device generally has tapered sides so that a carton or other item will be deflected away from the wall and the tie down device when that carton or item comes into contact with the tie down device. Even with this feature, the tie down device is often torn loose from the wall by heavy merchandise that is transported into the container by heavy equipment such as a fork lift truck. Additionally, the tie down rings which are pivotally mounted to the tie down device will often, due to the strain applied to them, bend the bracket to which they are mounted and, therefore, the ring or device will not pivot into the recess of the tie down device. The tie down ring will then project further beyond the surface of the tie down device and is therefore more readily subject to further damage. Additionally, the number of tie down devices provided is in many cases not adequate to secure the cargo in position. The limited number of the tie down devices often places the cargo to be secured at a distance from the tie down device and thus makes it difficult to secure the cargo in place.

BRIEF SUMMARY OF THE INVENTION

A preferred embodiment of a tie down system for cargo of the present invention has slots positioned at intervals in the vertical walls of the cargo area of the transporting unit. The preferred embodiment by way of example illustrates a carrier utilized to transport cargo over land. The slots in the preferred embodiment are in the shape of a cross, that is a vertical slot intersects a horizontal slot. The slots are more closely positioned along the longitudinal length of the vertical wall and along the vertical height of the vertical wall than previous tie down devices. The slots are arranged for the insertion of a securement or tie down device that is utilized to secure cargo in position such as by ropes, straps or other securing devices. The tie down devices are simply inserted into the slots that are strategic to the cargo to be secured and securing devices engaging the cargo are attached to the tie down devices to secure the cargo in place. The tie down devices may be positioned either in the vertical slot or the horizontal slot of the cross and may be positioned at either end of the vertical or horizontal slot. The tie down device includes a ring that is mounted through a cross bore of the tie down device and the tie down device may be positioned in the slot so the tie down ring may be pivoted about either a vertical or a horizontal axis. For added clamping and strength, a securement device such as a nut is utilized to secure the tie down device in position in the slot. An optional locking device is provided to lock the tie down device in the desired position within the slot whether a securement device is utilized or not. The arrangement of the multiple slots in the vertical walls of the container facilitates the use of other tie down devices such as bars that have extending members that fit into multiple slots and thus provide a tie down device that has an extended length for attachment of securing devices along any portion of the length of the bar to facilitate securing containers that may have an odd shape such as a cylinder, for example.

Refer now to the drawings and the detailed description for a full understanding of the invention.

BRIEF DESCRIPTION OF THE DRAWINGS

FIG. 1 is a view of a cargo area of a carrier utilizing the tie down system of the present invention;

FIG. 2 is a view of a configured slot of the tie down system utilized in the cargo area of FIG. 1;

FIG. 3 is another view of the slot of FIG. 2;

FIG. 4 illustrate back up plates mountable strategic to the slot of FIG. 2;

FIGS. 5 and 6 are views of tie down devices insertable into the slot of FIG. 2;

FIG. 7 illustrates the manner of inserting the tie down devices of FIGS. 5 and 6 into the slot of FIG. 2;

FIG. 8 illustrates another tie down device;

FIG. 9 illustrates a locking member for securing a tie down device into the slot of FIG. 2;

FIG. 10 illustrates another device for securing cargo by utilizing the slots of FIG. 2;

DESCRIPTION OF THE PREFERRED EMBODIMENT

Figure 11:
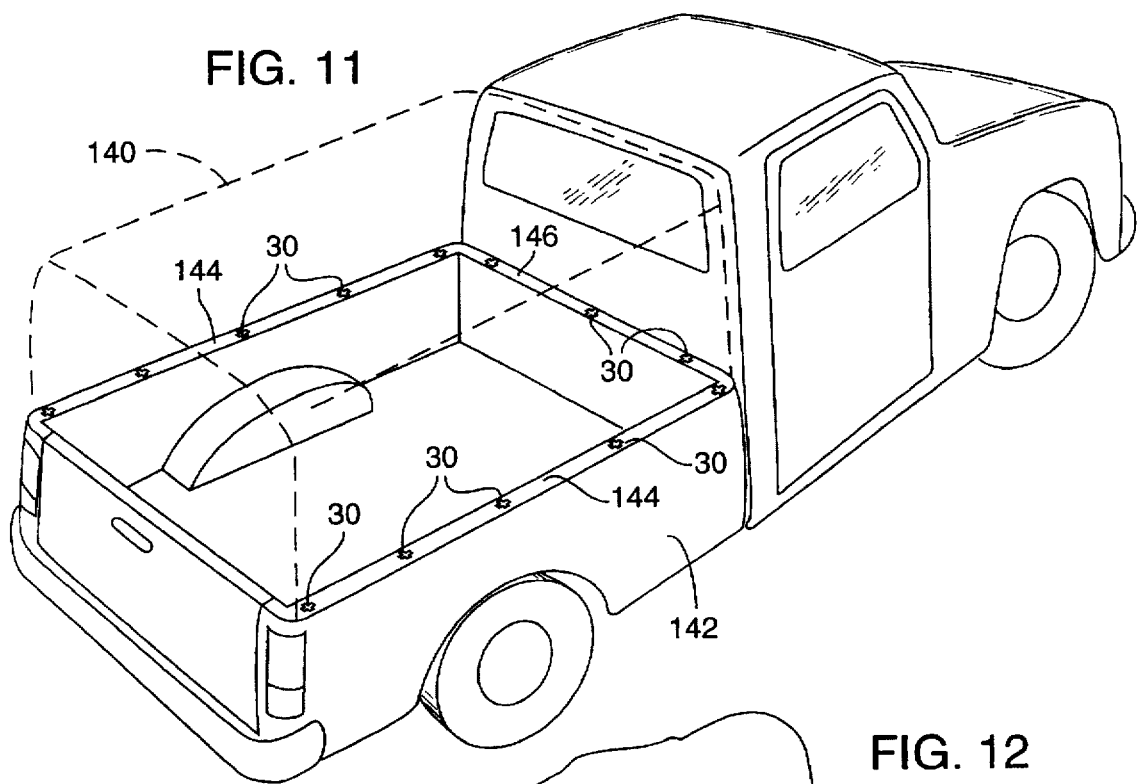
FIG. 11 is view showing the slots of FIG. 2 provided in the side rails of a carrier bed; and, FIG. 12 is a cutaway view of the bed of FIG. 11.
Figure 12:
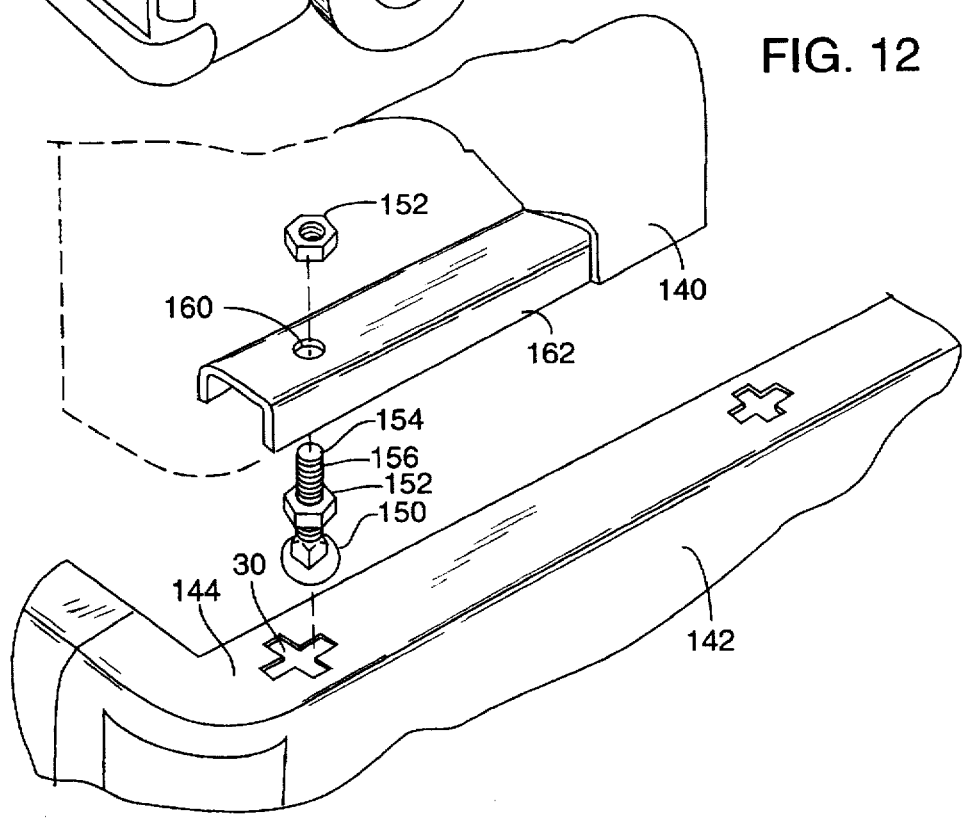

FIG. 1 illustrates a cargo area of a transporting unit, such as a truck, that is utilized for the placement of cargo to be transported. In this embodiment, the cargo area has a floor 10, opposed interior side walls 12, an end wall 14 and a top cover portion or roof 16. Typically the cargo area will have doors 18 to define the opposite end wall of the cargo area and to provide an entry to the cargo area. In this embodiment, the cargo area is of the type that has an outer skin (cover) 20 such as metal secured to one side of vertical struts 21 for protection of the cargo area from the elements as indicated at 11 in FIG. 1. The end wall 14 and the side walls 12 are typically of plywood construction that are mounted to the vertical supporting struts 21 on the side opposite the skin 20. The vertical struts thus provide a space 13 between the skin 20 and the end wall 14 and the opposed side walls 12.

Configured slots 30 are formed in the opposed side walls 12 and the end wall 14. As shown in FIG. 1, the slots 30 are provided at intervals along the horizontal length of the end wall 14 and the side walls 12 and are also provided along the vertical height of the end wall 14 and the side walls 12. The slots 30 are provided at select intervals or patterns on each of the vertical walls 12, 14. However, it will be appreciated that the distance between each slot either along the vertical or horizontal may be varied as well as the pattern of the slots on each of the side and end walls 12,14. While the slots 30 are illustrated in the side walls 12 and end wall 14, the slots may also be provided in the other walls of the cargo area defined by the roof 16, the floor 10 and the doors 18.

FIG. 2 illustrates one of the slots 30 that are provided in the interior walls of the cargo area of FIG. 1. The slot 30 has a horizontal slot 32 that intersects a vertical slot 34. In this embodiment, the slot 30 is symmetrical with the slot 32 intersecting the slot 34 at its mid-point and vice versa. The intersection of the slots 32 and 34 provide an opening for the insertion of a tie down device which will later be explained. It will be appreciated that the slot 30 may be rotated to any degree that is desired for a particular application. That is, the horizontal slot 32 need not lie on the horizontal plane nor does the vertical slot 34 need to lie on the vertical plane.

Referring to FIG. 4, a back-up plate 40 which has a slot 42 formed therein is placed strategic to the slot 30 formed in the walls 12 (14) for added structural integrity. The slot 42 is of the same configuration and size as the slot 30 formed in the walls 12, 14. The back-up plate 40 is preferably mounted on the side 24 of the walls 12, 14 (see FIG. 1). The back-up plate 40 is mounted (attached) in a conventional manner to the side 24 of the interior walls 12, 14 and is positioned such that the slot 42 in the back-up plate 40 is aligned with the slot 30 in the interior walls 12, 14.

FIG. 4 also illustrates another back-up plate 46 that has a slot 48 formed therethrough that will align with the slot 30 provided in the walls 12, 14. The back-up plate 46 has a projecting member 47 affixed to the back-up plate 46 in alignment with the slot 48. The projecting member 47 is configured to be inserted into the slot 30 when the plate 46 is attached to the side 24 of the walls 12, 14. When the back up plate 46 is utilized the slot 30 is enlarged to receive the projecting member 47.

FIGS. 5 and 6 illustrate two typical tie down devices 50 and 70 that are insertable into the formed slots 30 (and/or the projecting member 47 received in the enlarged slot 30) that are provided in the interior end wall 14 and the opposed side walls 12. The tie down device 50 of FIG. 5 has a carriage bolt type head 52 and has a shank portion 54 that extends from the head 52. The shank 54 has a square section 56 that extends from the head 52 to a circular threaded portion 58. A cross bore 60 is provided in the end 66 of the shank portion 54 opposite the head 52 with the bore sized to receive a ring 64. End 66 which may be provided with a variety of securing implements is sometimes referred to as the working end of the shank.

The tie down device 70 of FIG. 6 is similar to the tie down device 50 except that it has a conventional hex type bolt head 72. The tie down device 70 has a shank portion 74 that extends from the head 72 and the shank portion 74 has a square section 76 that extends from the head 72 to the threaded portion 78. The end 80 of the shank 74 is provided with a cross bore 82 and the cross bore 82 is sized to receive a ring 84.

Either of the tie down devices 50 and/or 70 may be provided with a nut 90 that is threadably mounted on the threaded portion 58, 78 of the tie down devices 50, 70. The nut 90 is preferably of the washer type that has a washer portion 92 fixedly formed with the nut 90. For added gripping, the washer portion 92 is knurled or provided with serrations 94, but may be smooth where the added gripping is not deemed necessary. The nut 90 is installed on either of the tie down devices 50 and 70 prior to the installation of the rings 64, 84. The nut 92 is tightened against the side 22 of the wall (12, 14) when the tie down device (50, 70) is installed in a slot 30 to secure the tie down device (50, 70) in a slot 30.

The slots 30 formed (and the projecting members 47 received in the enlarged slots 30) in the opposed side walls 12 and end wall 14 are preferably sized such that the square shank 54 of the device 50 and the square shank 74 of the device 70 will fit closely in either of the slots 32 and 34 of the composite slot 30. FIG. 3 illustrates the square shank of a tie down device, such as tie down device 50 or 70, may be positioned at either end of each of the slots 32 and 34 of the composite slot 30. The tie down device will be positioned to assure that when a securing device is attached to the tie down device, the tie down device will not be moved to the center portion of the slot 30.

The head 52 and 72 of the devices 50, 70 are preferably large enough such that the tie down devices 50, 70 must be tilted in order to insert the devices 50, 70 into the slots 30. Thus in use, if the devices should slide to the center of the slot, the heads will not come out of the slot. The manner of inserting the tie down devices 50, 70 into the slot 30 is illustrated in FIG. 7. Should the heads 52, 72 of the tie down devices 50, 70 be too large to be inserted into the composite slot 30, the corners 36 of the slot 30 (see FIG. 2) may be clipped or relieved as indicated by arc 38. This will enlarge the opening permitting the insertion of tie down devices 50, 70.

Referring again to FIG. 1, a cargo 138 is secured in the cargo area by the tie down system of the present invention. As shown a tie down device 50 is installed in a slot 30. The head 52 of the tie down device engages the side 24 of the wall 12 and the square section 56 resides in the slot 30 (see FIG. 3). A securing device such as a rope 142 is attached to the ring 64 of the tie down device 50 and extends around the cargo 138. Another tie down device 50 is fitted in a slot 30 in the wall 14 (out of view in the figure) and the opposite end of the rope 142 is secured to the ring 64 of the device 50. The rope 142 is tightened in a conventional manner to secure the cargo 138 in position. The arrangement of the multiple slots 30 in the end and side walls 14, 12 facilitates securing the cargo in position by utilizing any one or more of a number of slots that are strategic to the cargo to be secured.

FIG. 8 illustrates another tie down device 100. The tie down device 100 has an elongate bar 102 on which two fasteners 104 and 106 are fixedly attached. The fasteners 104, 106 are similar to the tie down devices 50,70 having a head portion to engage side 24 of the wall 12, 14 and a shank portion that fits in the slot 30. The fasteners 104 and 106 are strategically spaced so that the fastener 104 will fit into one slot 30 and the fastener 106 will fit into another slot 30. The tie down device 100 will thus be attached to one of the walls 12, 14 and will provide an extended length defined by the bar 102 to which securing devices such as ropes, straps etc. may be attached to secure the cargo.

A lock 110 as illustrated in FIG. 9 is utilized to secure the tie down devices (such as 50, 70) in the composite slots 30. The lock 110 is an L shaped member that will fit into one of the slots 32, 34 to secure the tie device in the other slot 32, 34. The lock 110 is preferably sized so that it has a friction fit in the slot 30. The lock 110 has a flange 112 that will engage the surface of the wall 12, 14 (side 22) to prevent the lock 110 from passing through the slot 30. The projection 114 will extend into the slot 32, 34 in which the tie device 50, 70 is installed and will abut the square portion 56, 76 of the tie down devices 50, 70 to retain the tie down devices 50, 70 in the slot 30. The lock 110 may be fitted with a conventional key lock to prevent removal of the lock 110.

There are some cargo areas of carriers that have the vertical walls (e.g., side wall 122) and supporting struts 121 formed as an integral unit. This is illustrated in FIG. 1 at 120. In this arrangement, there is not a space between the inner walls and the outer skin. The slots 30 extend clear through the wall 122. To protect the cargo area from the elements a formed flange (cover) 126 is provided to be mounted on the exterior of the wall 122. The flange 126 in addition to protecting the cargo area from the elements provides the space necessary to insert the tie down devices 50, 70 (and others).

FIG. 10 illustrates another manner of utilizing the slots 30 provided in the side walls 12. A rod 130 having one way clutches at 132 extends from one wall 12 to the opposite wall 12. The rod 130 is secured to each wall 12 by tie down devices 134 fitting in the slots 30. The one way clutches 132 permit rotation of rod in one direction but is resisted in the opposite direction. The devices 134 (which have a square shank like devices 50, 70) fitting in the slots 30 prevent rotation of the devices 134. The rod 130 is rotated and forced against the cargo 138 to secure the cargo in position in the cargo area.

It is contemplated that the tie down system of the present invention may be utilized on transporting carriers for securing other items than cargo. FIG. 11 illustrates a shell 140 mountable on the cargo bed 142 of a vehicle such as a pickup truck. Slots 30 are formed in the tops of the side rails 144 and end rail 146 of the bed 142. Tie down devices 150 similar to the tie down device 50 having a threaded shank portion 156 but without the ring 64 are installed in the slots 30 formed in the tops of the rails 144 and 146. The tie down devices 150 are secured in position by a nut 152 threadably installed on the threaded portion 156 of the tie down device 150 and engaging the top surface of the rails 144, 146. The shell 140 has apertures 160 provided in the channels 162 through which the extending shank 154 of the tie down device 150 will extend when the shell 140 is lowered onto the rails 144, 146. Another nut 152 is threadably installed on the shank 154 protruding through the channel 162 to secure the shell 140 to the bed 142.

Alternatively the nut 152 may be secured to the portion 156 (or simply provided with a bolt head) and the aperture 160 configured as a key slot. The slot and bolt arrangement would permit the shell 140 to be positioned with the nuts 152 aligned with the large end of the key slots, lowered onto the rails 144, and with the nuts (or bolt heads) 152 protruded through the slots, the shell would be slid forward and into the desired position as shown in FIG. 11.

Those skilled in the art will recognize that other modifications and variations may be made without departing from the true spirit and scope of the invention. The slot 30 for example, instead of being in the form of a cross may be an elongate slot such as either slot 32 or slot 34. The lock 110 may be provided in other configurations. The lock 110 may for example be a straight member that extends to the opposite end of the slot in which the tie down device 50, 70 is installed. The straight lock member would be sufficiently long to retain the tie down device 50, 70 in the slot 30. The invention is therefore not to be limited to the embodiments described and illustrated but is to be determined from the appended claims.

What is claimed is:

1. A securement system for securing items to a cargo area defined by walls having opposed first and second sides, comprising:

elongated slots formed in the walls at multiple positions and configured to have an entry portion at one end of the slot and the remainder comprising a confining portion;

a securement device having a head portion, a shank portion and a working portion, said head portion and said shank portion cooperatively configured relative to said slots whereby said head portion is insertable through said entry portion of the slot from said first side for placement of the head portion at the second side, the shank portion protruding through the slot, said confining portion of the slot receiving the shank portion and not the head portion of the device allowing slidable positioning of the device from the entry portion into the confining portion of the slot, the head portion engaging said second side and preventing removal of the securement device; and said shank portion as positioned for securing items to a cargo area projected substantially perpendicular to the wall in which the slot is formed, and said entry portion of the slot configured to prevent passage of the head portion with a device positioned in the securement position and permitting passage of the head portion only with the device tilted out of the securement position to thereby prevent inadvertent removal of the device from the slot while the device is securing items to a cargo area.

2. A securement system as defined in claim 1, wherein:

the slots formed in the walls are a composite of at least two slots as defined in claim 1 intersecting one with the other, each of the intersecting slots having its entry portion at the point of intersection; and, the securement device insertable at the point of intersection with the shank received in the confining portion of any one of the intersecting slots.

3. A securement system as defined in claim 2, wherein:

the shank of the securement device has opposed parallel sides extending from the head, the distance between the opposed parallel sides corresponding closely to the width of the confining portion of the slots.

4. A securement system as defined in claim 3, further including:

a backup plate mounted to the wall on the second side thereof and having a slot conforming to and aligned with the slot in the wall.

5. A securement system as defined in claim 2, wherein:

the intersection of the intersecting slots of the composite slot is enlarged to facilitate inserting the head of the securement device into and through the composite slot.

6. A securement system as defined in claim 1 including means for resisting removal of said securement device from said slot.

7. A securement system as defined in claim 6 wherein said means includes a lock mechanism that locks the device for movement back to the entry portion position of the slot.

8. A securement system as defined in claim 7 wherein the lock member comprises a threaded portion provided on the shank and a nut engaging the threaded portion to be turned against the first side of the wall and clamping the wall between the head portion and the nut to prevent removal of the device in the slot.

9. A securement system as defined in claim 6 wherein said means for resisting removal is provided by the configuration of the entry portion of the slot as related to the head portion of the device requiring lateral insertion and removal of the head portion requiring the shank portion to be extended along the wall, the shank portion when in use extended substantially normal to the wall, whereby positioning of the device at the entry position of the slot with the device in use prevents removal.

10. A securement system as defined in claim 6 wherein said means for resisting removal is a lock member inserted in said slot thereby preventing movement of the device into the entry portion of the slot.

11. A securement system as defined in claim 1, wherein:
a bar is secured to the working portion of a pair of spaced apart securement devices secured to a pair of spaced apart slots as defined in claim 1.

12. A securement system as defined in claim 11, further including:
a locking device, the locking device insertable into the formed slot in the wall, the locking device engaging the shank of the tie down device inserted in the same formed slot to lock the tie down device in position in the formed slot.

13. A securement system as defined in claim 11 wherein:
the bar extends between opposed side walls, said pair of slots provided in the opposed side walls, and said bar having a center portion offset from the slots and a one way clutch mechanism that permits rotative movement of the center portion into a cargo load to be held there by the clutch mechanism.

14. A securement system as defined in claim 1, further including:
a ring attached to the shank portion and comprising the working portion of the securement device for attachment of a cargo securing device.

15. A securement system as defined in claim 1 wherein:
said walls include side walls having upper edges that define rails, said slots formed in said rails and said tie down devices protruded upwardly from said slots, and a cover having matching rails and receiving slots that receive said tie down devices for securing said cover to said side walls.

16. A securement system comprising:
a container having a wall;
said wall having opposed inner and outer sides, a plurality of slots each having an entry portion and a confining portion provided in said wall as a pattern of slots extending along said wall both laterally and vertically, said wall otherwise being flush and thereby avoiding interference of loading of items into the container and against the wall's inner sides;
securement devices configured to have a head portion, a shank portion and a working portion, said head portion configured cooperatively with said slots to be insertable through the entry portion of any of said slots from the inner side and positionable from the entry portion to the confining portion and as inserted and positioned being projected from said outer side of the wall with the shank portion extended through the slot and the head portion abutting the outer side of the wall; and
said slots each having multiple confining portions extended in different directions from the entry portion for selected positions of the devices as may be desirable for receiving various cargo items in the container.

17. A securement system as defined in claim 16 wherein said means includes a lock mechanism that locks the device against movement back to the entry portion position of the slot.

18. A securement system as defined in claim 17 wherein the lock member comprises a threaded portion provided on the shank and a nut engaging the threaded portion to be turned against the inner side of the wall and clamping the wall between the head portion and the nut to prevent slidable movement of the device along the slot.

19. A securement system as defined in claim 16 wherein said means for resisting removal is provided by the configuration of the entry portion of the slot as related to the head portion of the device requiring lateral insertion and removal of the head portion with the shank portion extended along the wall, the shank portion when in use projected substantially normal to the wall, whereby slidable positioning of the device to the entry position of the slot with the device in use does not enable removal.

20. A securement system as defined in claim 16 wherein said means for resisting removal is a lock member inserted in said slot thereby preventing movement of the device into the entry portion of the slot.

21. A securement system for a pickup truck bed having side walls defining upper rails having a top side and a bottom side, said securement system comprising:
a plurality of elongated slots strategically positioned on the side wall rails and configured to have an entry portion at one end of the slot and the remainder comprising a confining portion, fasteners having a head portion, a shank portion and a working portion, said head portion and said shank portion cooperatively configured relative to said slots whereby said head portion is insertable through said entry portion of the slot from said top side for placement of the head portion at the bottom side, the shank portion protruding through the slot, said confining portion of the slot receiving the shank portion and not the head portion of the device allowing slidable positioning of the device in the confining portion of the slot, the head portion engaging said bottom side and preventing removal of the securement device, said fasteners securable to accessory items for securing an accessory item to the rails of a pickup truck bed.

22. A securement system as defined in claim 21 wherein said accessory item is a canopy to be secured to the truck bed as a cover therefor.

23. A securement system for securing items to a cargo area defined by walls having opposed first and second sides, comprising:
elongated slots formed in the walls at multiple positions and configured to have an entry portion at one end of the slot and the remainder comprising a confining portion;
a securement device having a head portion, a shank portion and a working portion, said head portion and said shank portion cooperatively configured relative to said slots whereby said head portion is insertable through said entry portion of the slot from said first side for placement of the head portion at the second side, the shank portion protruding through the slot, said confining portion of the slot receiving the shank portion and not the head portion of the device allowing slidable positioning of the device from the entry portion into the confining portion of the slot, the head portion engaging said second side and preventing removal of the securement device; and
a back up plate mounted to the wall on the second side thereof and having a slot conforming to and aligned with the slot in the wall, the backup plate including a projection through the wall and forming a lining that defines the slot.

24. A securement system for securing items to a wall having opposed first and second sides, comprising:

elongated slots formed in the wall at multiple positions and configured to have an entry portion at one end of the slot and the remainder comprising a confining portion;

a securement device having a head portion, a shank portion and a working portion, said head portion and said shank portion cooperatively configured relative to said slots whereby said head portion is insertable through said entry portion of the slot from said first side for placement of the head portion at the second side, the shank portion protruding through the slot, said confining portion of the slot receiving the shank portion and not the head portion of the device allowing slidable positioning of the device from the entry portion into the confining portion of the slot, the head portion engaging said second side and preventing removal of the securement device; and a portion of the shank portion of the securement device is threaded;

a nut mounted on the threaded portion, the nut engageable with the first side of the wall opposite the second side engaged by the head for clamping the device at a selected position in the slot.

25. A securement system for securing items to a cargo area defined by walls having opposed first and second sides, comprising:

elongated slots formed in the walls at multiple positions and configured to have an entry portion at one end of the slot and the remainder comprising a confining portion;

a securement device having a head portion, a shank portion and a working portion, said head portion and said shank portion cooperatively configured relative to said slots whereby said head portion is insertable through said entry portion of the slot from said first side for placement of the head portion at the second side, the shank portion protruding through the slot, said confining portion of the slot receiving the shank portion and not the head portion of the device allowing slidable positioning of the device from the entry portion into the confining portion of the slot, the head portion engaging said second side and preventing removal of the securement device; and said walls providing a continuous integral exposed surface and the slots provided by removal of wall material whereby other than the slot edges and without securement devices attached to the slots, no edges are exposed to a cargo having sliding engagement with the wall surface.

26. A securement system for securing items to a cargo area defined by walls having opposed first and second sides, comprising:

elongated slots formed in the walls at multiple positions and configured to have an entry portion at one end of the slot and the remainder comprising a confining portion;

a securement device having a head portion, a shank portion and a working portion, said head portion and said shank portion cooperatively configured relative to said slots whereby said head portion is insertable through said entry portion of the slot from said first side for placement of the head portion at the second side, the shank portion protruding through the slot, said confining portion of the slot receiving the shank portion and not the head portion of the device allowing slidable positioning of the device from the entry portion into the confining portion of the slot, the head portion engaging said second side and preventing removal of the securement device; and said slots each provided with at least two confining portions projected from a common entry portion, said two confining portions defining different slot directions to thereby provide selective arrangement of the devices in the slots.

* * * * *